United States Patent [19]

Teufel et al.

[11] Patent Number: 5,282,678
[45] Date of Patent: Feb. 1, 1994

[54] CART FOR MEDICATION

[75] Inventors: Rainer B. Teufel; Timothy A. Friar; Paul P. Kolada; Jerome M. Romick; Marc D. Taylor, all of Columbus, Ohio; Duane Beardsley, Berrien Springs, Mich.

[73] Assignee: Artromick International, Inc., Columbus, Ohio

[21] Appl. No.: 843,520

[22] Filed: Feb. 28, 1992

Related U.S. Application Data

[63] Continuation-in-part of Ser. No. 662,750, Mar. 1, 1991.

[51] Int. Cl.⁵ .............................................. E05B 65/46
[52] U.S. Cl. ................................. 312/221; 312/107.5; 312/249.8
[58] Field of Search .................... 312/107.5, 221, 222, 312/218, 219, 249.8, 209

[56] References Cited

U.S. PATENT DOCUMENTS

| | | | |
|---|---|---|---|
| 1,486,094 | 3/1924 | Lehman | 312/107.5 |
| 1,818,525 | 8/1931 | Perez . | |
| 3,329,473 | 7/1967 | Dickson . | |
| 3,736,035 | 5/1973 | Brown et al. . | |
| 3,767,280 | 10/1973 | McLaughlin | 312/219 |
| 3,779,623 | 12/1973 | Motohashi . | |
| 3,788,242 | 1/1974 | Hassel et al. . | |
| 4,352,529 | 10/1982 | Steinke | 312/221 |
| 4,466,676 | 8/1984 | Nilsson | 312/222 |
| 4,616,890 | 10/1986 | Romick . | |
| 4,691,970 | 9/1987 | Neri . | |
| 4,793,667 | 12/1988 | Gilliom . | |
| 4,822,116 | 4/1989 | Relyea et al. . | |
| 4,848,859 | 7/1989 | Edmonds et al. . | |
| 4,958,891 | 9/1990 | Taylor et al. . | |
| 5,050,942 | 9/1991 | Frederick et al. | 312/221 |
| 5,069,466 | 12/1991 | Propst . | |
| 5,069,511 | 12/1991 | Swets et al. | 312/107.5 |

Primary Examiner—Victor N. Sakran
Attorney, Agent, or Firm—Wood, Herron & Evans

[57] ABSTRACT

A medication cart has a base formed of a pair of molded plates interconnected by rails. The plates have molded grooves and holes for receiving structural elements of the cart. Molded hollow plastic end panels have horizontal ribs that support drawers. The end panels are seated in grooves in the base plates. A top cap covers the top of the cart. Locking bars which can be made to automatically open are provided to secure the drawers in the cart.

11 Claims, 12 Drawing Sheets

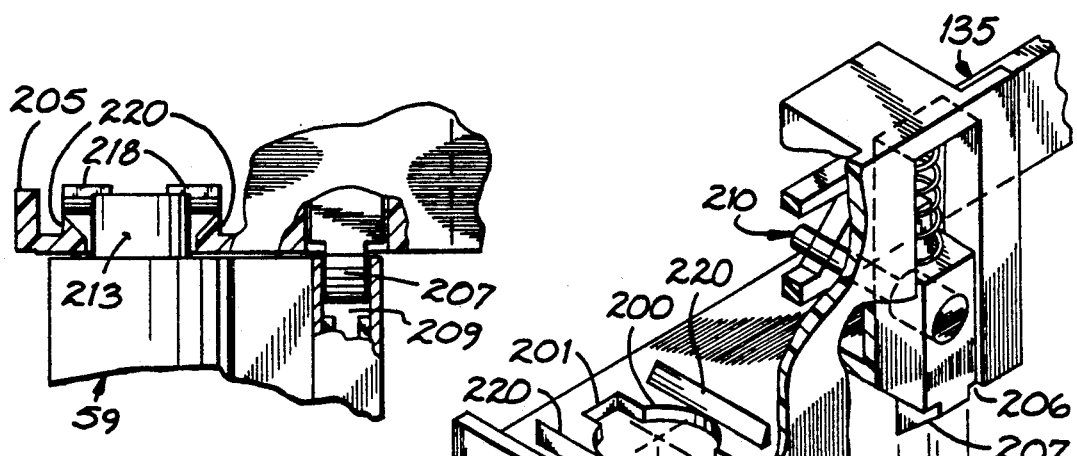
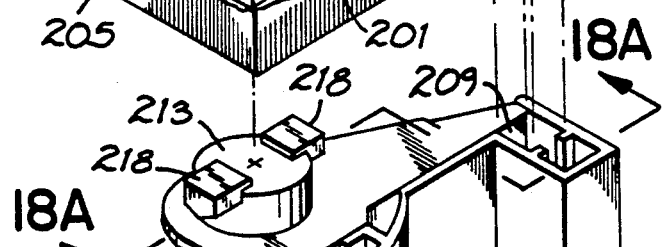
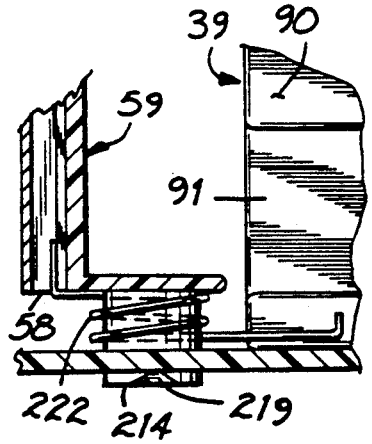
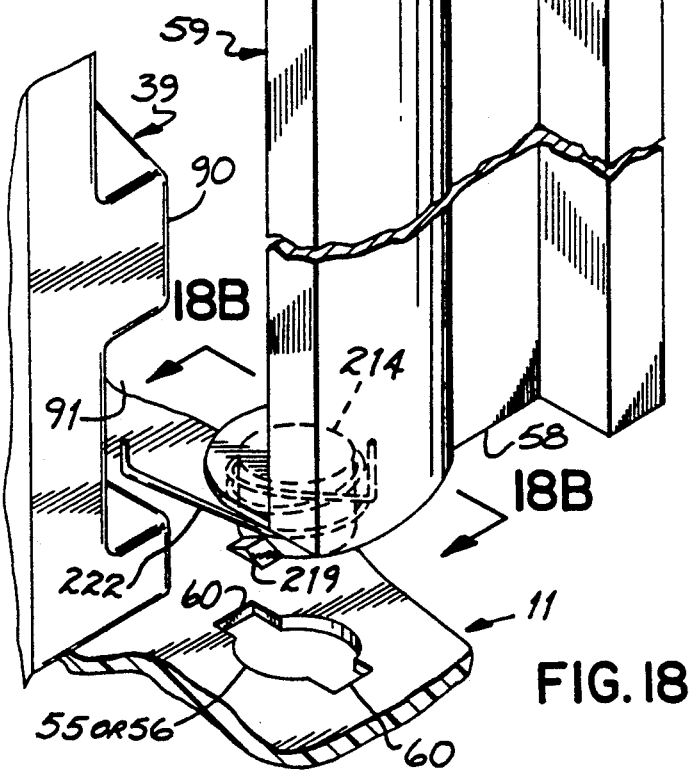
FIG. 18A
FIG. 18B
FIG. 18

CART FOR MEDICATION

RELATED APPLICATION

This application is a continuation-in-part application of U.S. patent application Ser. No. 07/662,750, filed Mar. 1, 1991, which application is assigned to the assignee of this application.

BACKGROUND OF THE INVENTION

This invention relates to a medication cart.

A medication cart is normally used with a system for administering medication to patients in a general or acute hospital or long term care facility. The cart has casters, permitting it to be pushed by a nurse from room to room. The cart has many drawers, most being dedicated to a patient and carrying a label with a patient's name. The drawers contain medicine and instructions for the administration of the medicines.

The nurse pushes the cart from room to room and, at each stop, gives the patient the required doses of medication. The cart is locked mechanically or electrically when it is unattended. The top-of-the-line cart in use at the present time requires a great many fabrication steps during which considerable care must be exercised to be sure that, among other things, guide rails are precisely aligned so that drawers will slide without binding. The cart has a castered base and a stainless steel cart frame mounted on the base. The vacuum-molded guide rail sheets are assembled in the stainless steel structure. The stainless steel is heavy and hence the cart, overall, is heavy. In transit the cart may be subjected to stress which tends to rack the cart, thus misaligning the drawers and locking system. When that occurs, the cart may have to be returned to the manufacturer in order to square up the cart.

When the raw stainless steel frames are received, they must go through lengthy quality control processes including numerous finishing processes and measurement processes.

The bottom plate installation is a time-consuming process requiring multiple holes to be drilled and riveted. The cart has locking doors that retain the drawers in a closed condition and the installation of lock sleeves and other parts relating to the operation of the locks is a time-consuming process. When the doors are unlocked, they have to be manually opened to gain access to the drawers.

The current method of vacuum-forming the guide rail sheets lends itself to inconsistencies in production making it difficult to hold tight tolerances for good quality control. The fabrication of the vacuum-formed ribbed sheets requires trimming the parts and attaching them to extrusions or rails, and that process requires a significant amount of time. After fabrication, the guide rails must be installed in the cart. Vertical and horizontal alignment of these guide rails is essential to the cart's functioning properly. The process requires skilled labor and considerable time, even with experienced labor. The foregoing are but a few of the problems attending the fabrication of a very good cart design.

SUMMARY OF THE INVENTION

It has been an objective of the present invention to provide a cart structure that greatly reduces assembly labor.

It is a further objective of the present invention to provide a cart design that is more aesthetically appealing and significantly lighter in weight. The cart at the same time is more able to withstand abuse than its predecessor.

Still another objective of the present invention has been to provide modular elements which, with a slight modification of the base structure and top structure, can be used to create a wide variety of cart configurations.

The following is a list of objectives and advantages that the new cart design attains:

1. Reduces the raw materials cost for cart equipment.
2. Reduces labor cost associated with the cart assembly process.
3. Reduces inventory cost by using interchangeable cart frame components.
4. Reduces inventory by having common tops for all cart series.
5. Eliminate some fabrication on cart top caps and costly fabrication mistakes.
6. Eliminate the stainless steel mainframe for several reasons:
   rising costs of stainless
   frame damage in transit to steel frame
   carts
   welding problems (quality control)
   weight problems (cost of shipping)
   (some weight complaints)
7. Eliminate separate guide rail assembly process (vertical and horizontal alignment problems).
8. Eliminate different style guide rails for different cart series.
9. Eliminate having to custom fit the locking doors for each cart frame.
10. Minimize change order problems during production (modular changeover for locking systems); standardize top caps.
11. A design that can be shipped to another assembly point in knock-down version.
12. Make the unit more serviceable in the field.
13. Make the unit more secure and resistant to unauthorized entry.

These objectives of the invention are attained by providing certain novel structural elements that form the keystone structure and permit the creation of many cart configurations while permitting the achievement of the foregoing objectives. The structure includes a base plate molded from an injection molded plastic with specifically oriented grooves, holes, and threaded inserts that receive casters, base rails that form a rectangular base for the cart, end panels and central panels, sliding doors and a bumper rail. Hollow panels provide end panels and a central panel. Aluminum posts connected by engineered plastic and/or aluminum angle brackets mounted to the base and connected by engineered plastic and/or aluminum angle brackets to upper cross rails pass through the hollow end panels and provide a rugged but flexible support structure for the cart. The engineered plastic is extremely strong but nevertheless resilient enough to give when the cart is subjected to a racking stress and return the cart to its squared condition when the stress is removed. The post structure and hollow end panels mutually contribute to each other to provide the ruggedness referred to above. This is important in daily use for the simple reason that nurses sometimes use the cart to push through doors rather than opening doors to permit the cart to pass through. In other words, the cart does take a lot of abuse in its day-to-day use, and ruggedness is important.

Another feature of the invention resides in the locking bar or door structure for locking the drawers in a closed position. In the preferred embodiment, the locking bars open automatically and close manually. The locking bars are easily assembled, reliably locked and do not swing beyond the confines of the bumper rail on the base of the cart. Thus, the bumper rail protects open locking bars from damage by banging against health care facility structures. Further, each locking bar is cammed upwardly against the fitting in which it is pivoted, thereby minimizing access to the lock bolt that projects into the locking bar.

Another feature of the invention is the structure by which the optional cabinet end is formed and assembled. That structure includes a cabinet end wall and two side wing walls that are joined to the cabinet end wall by mating male and female interlocking parts. A control panel frame interlocks with the wing walls and cabinet end wall. The base has a slot for receiving a bottom rib of the cabinet end wall and has two holes for receiving bottom studs of the wing walls. Thus, the whole cabinet structure is tied together through interlocking elements molded into the respective parts. Furthermore, the completed cabinet has a pair of sliding doors that ride in grooves on the base plate. A novel antifriction roller bearing structure is provided for the sliding doors.

Another feature of the invention has been to mold horizontal ribs and grooves in the hollow panels, these panels forming the exterior end and interior walls of the cart. Since these panels are mounted in grooves molded in the base structure, there is always assurance that the ribs and grooves will be properly aligned to provide drawer slides that will not bind.

Another feature of the invention has been to provide a preassembled lock collar, that is, a rectangular frame formed of stainless steel channels. The lock collar is mounted simply by attaching screws that connect it to the angle brackets on the upper part of the cart.

BRIEF DESCRIPTION OF THE DRAWINGS

The several features of the invention will become more readily apparent from the following detailed description taken in conjunction with the accompanying in which:

FIG. 1A is a fragmentary view of the encircled area of FIG. 1;

FIG. 4A is an enlarged perspective view showing the interlock connection of cabinet wings to back panel;

FIG. 18 is a fragmentary perspective view of an automatic locking bar and associated structure;

FIG. 18A is a cross-sectional view taken on line 18A—18A of FIG. 18;

FIG. 18B is a cross-sectional view taken on line 18B—18B of FIG. 18.

DETAILED DESCRIPTION OF THE INVENTION

Figure 1:
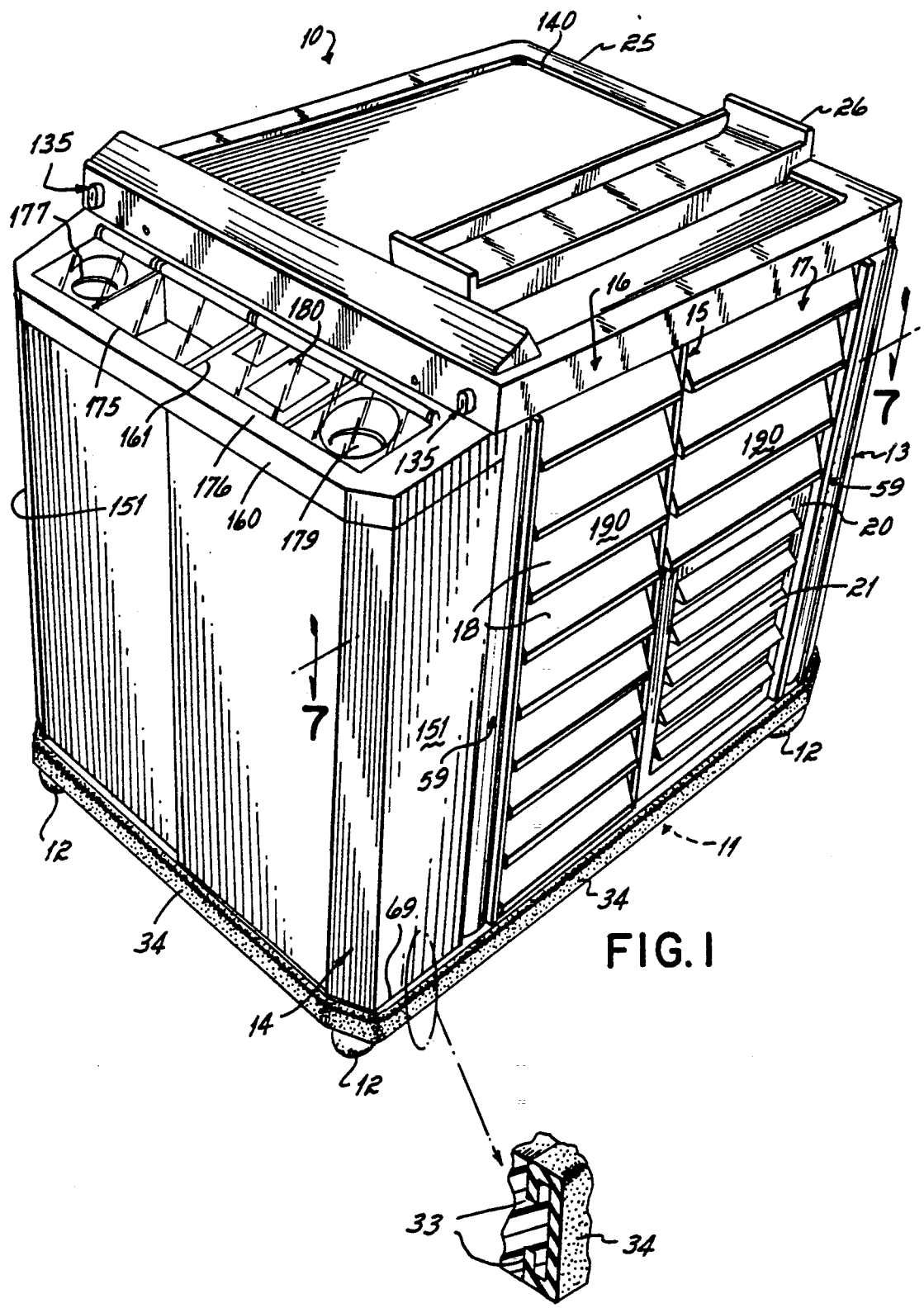
FIG. 1 is a perspective view of a cart.

Referring to FIG. 1, a representative cart 10 is shown in perspective. The cart has a base 11 on which four casters 12 are mounted to provide rolling support for the cart. The cart has an end panel 13 at one end and a cabinet 14 at the other end. A center panel 15 divides the cart into two sections 16 and 17. Section 16 has a plurality of vertical drawers 18. Section 17 has a plurality of similar drawers and a cassette 20 which contains a plurality of drawers 21, the drawers in section 17 being wider than the drawers 18. The cassette 20 is the subject matter of U.S. Pat. No. 4,616,890 which is incorporated herein by reference. Each drawer 21 may have three individual compartments (not shown) that are dedicated to a particular patient. The opposite side of the cart has a corresponding set of drawers and cassette so that in the illustrated embodiment the cart is dual-sided with drawers being accessible from both sides. A plastic cap 25 is mounted on the top of the cart. The cap center portion is slightly recessed and optionally can retain a tray 26.

The cart is built up from modular components as best illustrated in FIGS. 2, 3, 4 and 5. The cart of FIGS. 2, 3, 4 and 5 is exemplary of one of a wide variety of carts that can be manufactured from essentially identical components. Illustrative of the variety of carts are the nine carts depicted in FIGS. 14A-16C.

Figure 2:
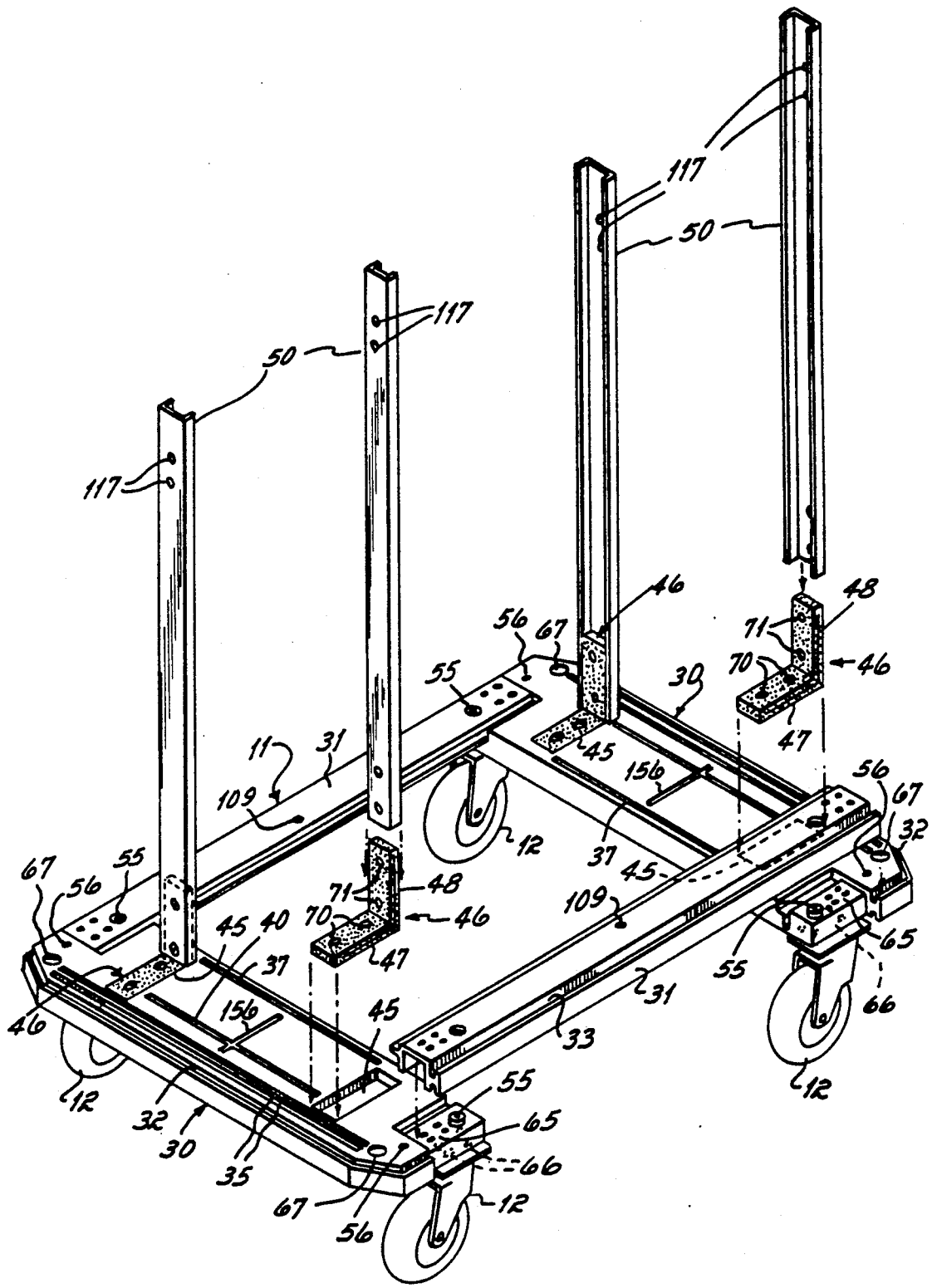
FIG. 2 is a disassembled perspective view of several pieces of the framework for the cart of FIG. 1.
Figure 11:
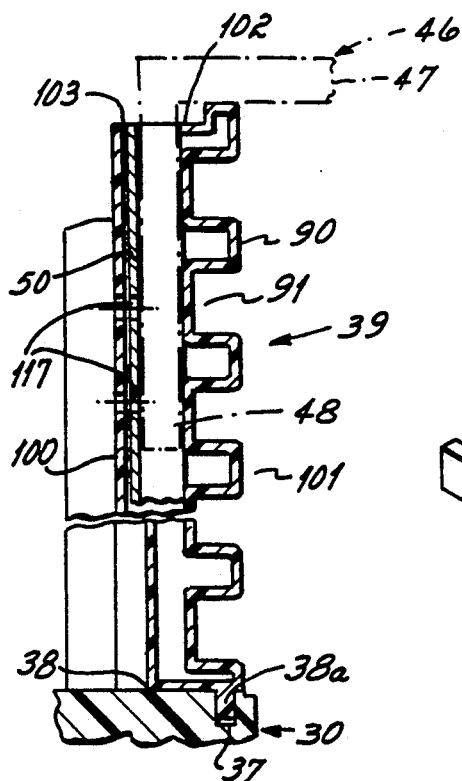
FIG. 11 is a fragmentary cross-sectional view taken on line 11—11 of FIG. 3.

As shown in FIG. 2, the base 11 is formed of two identical transverse base plates 30 interconnected by longitudinal connecting rails 31. Each base plate 30 is preferably molded from an injection molded plastic, such as an ABS plastic or an ABS and polycarbonate blend. Each rail 31 is an aluminum extrusion. Each base plate 30 has a shallow U-shaped groove 32 which is a continuation of a longitudinal groove 33 in the rail 31. Thus, there is provided a groove formed completely around the perimeter of the base 11 of the cart, and that groove can receive a bumper 34 (FIGS. 1, 1A). Each plate 30 also has a pair of parallel grooves 35 which are adapted to receive the bottom edges of a pair of sliding doors that are used to enclose the cabinet 14. The base plate also has a transverse groove 37 at its inner edge which receives a tongue 38a on the bottom edge 38 of a cabinet back panel 39 (see FIGS. 3 and 11). Each plate 30 has a groove 40 adjacent its outer edge which receives a tongue 41a on the bottom edge 41 of the end panel 13 (see FIGS. 3 and 12).

Figure 13:
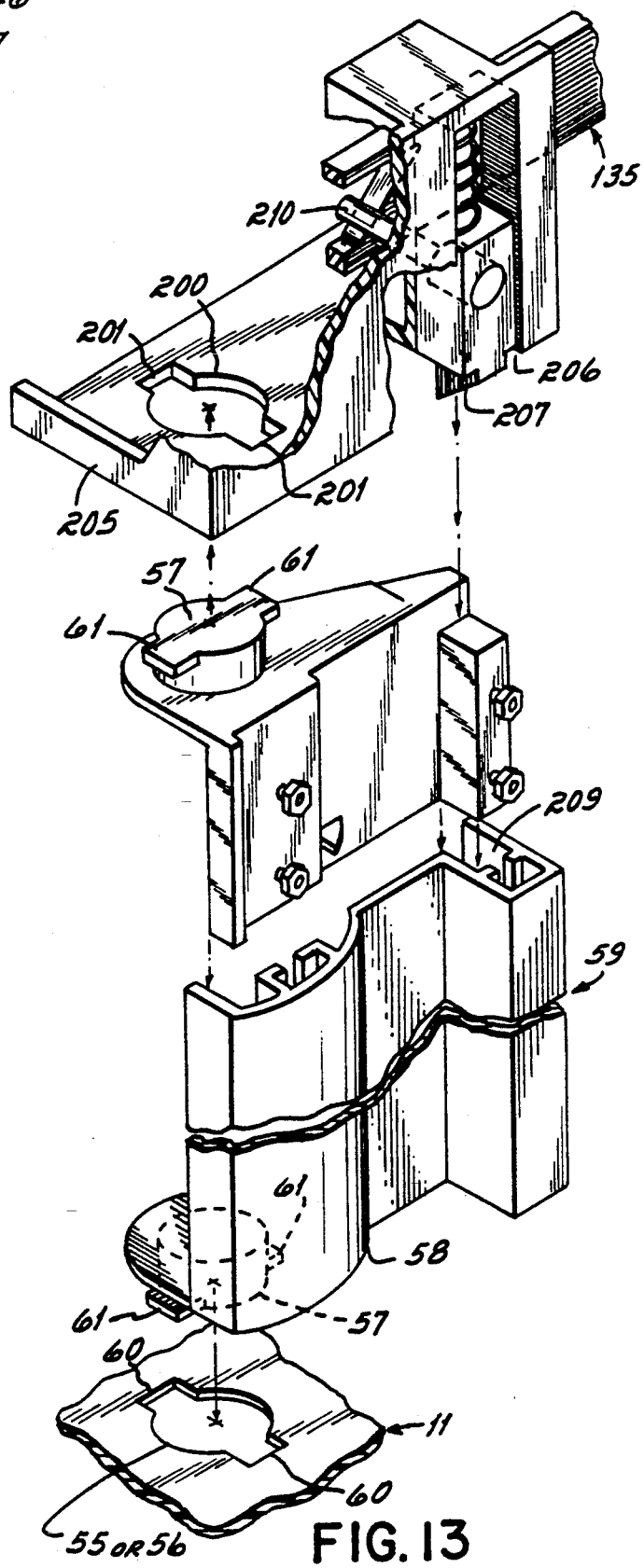
FIG. 13 is a fragmentary perspective view of a locking bar and associated structure.

Each base plate 30 also has a pair of rectangular recesses 45 which receive L-brackets 46, each L-bracket having a horizontal leg 47 that is seated in the recess 45 and a vertical leg 48 that projects vertically from the base plate. As can be seen from FIG. 2, the L-brackets at one end of the cart have their vertical legs at the inner edge of the base plate. They are positioned to receive aluminum posts 50 that will support the cabinet back panel 39. At the other end, the L-brackets 46 have vertical legs 48 at the outer edge of the base plate 30 to support posts 50 that receive the end panel 13. The base plate 30 also has an inner hole 55 and an outer hole 56 on each end to receive a stud 57 (FIGS. 5, 13 and 18) at the lower end 58 of a locking bar 59 (to be described below). It can be seen from FIG. 5 that the locking bars 59 adjacent the cabinet back panel 39 are fitted in the inner holes 55 and the locking bars for the end panel 13 are received in the outer holes 56. As seen in FIG. 13, each hole 55, 56 has lateral slots 60 that receive laterally-projecting wings 61 on the locking bar studs 57 so that once the doors are in operative position, they cannot be inadvertently removed (see also FIG. 18). The base plates 30 have at each end a pattern of four holes and threaded nuts, indicated at 65. Those holes and nuts underlie the ends of the rail 31 and provide the means for securely attaching the rail 31 to the base plate 30. On the underside of the base plate 30, there is also a pattern of four holes and nuts 66 molded into the base plate 30. These holes and nuts provide the means for securing each caster to the base.

Figure 5:
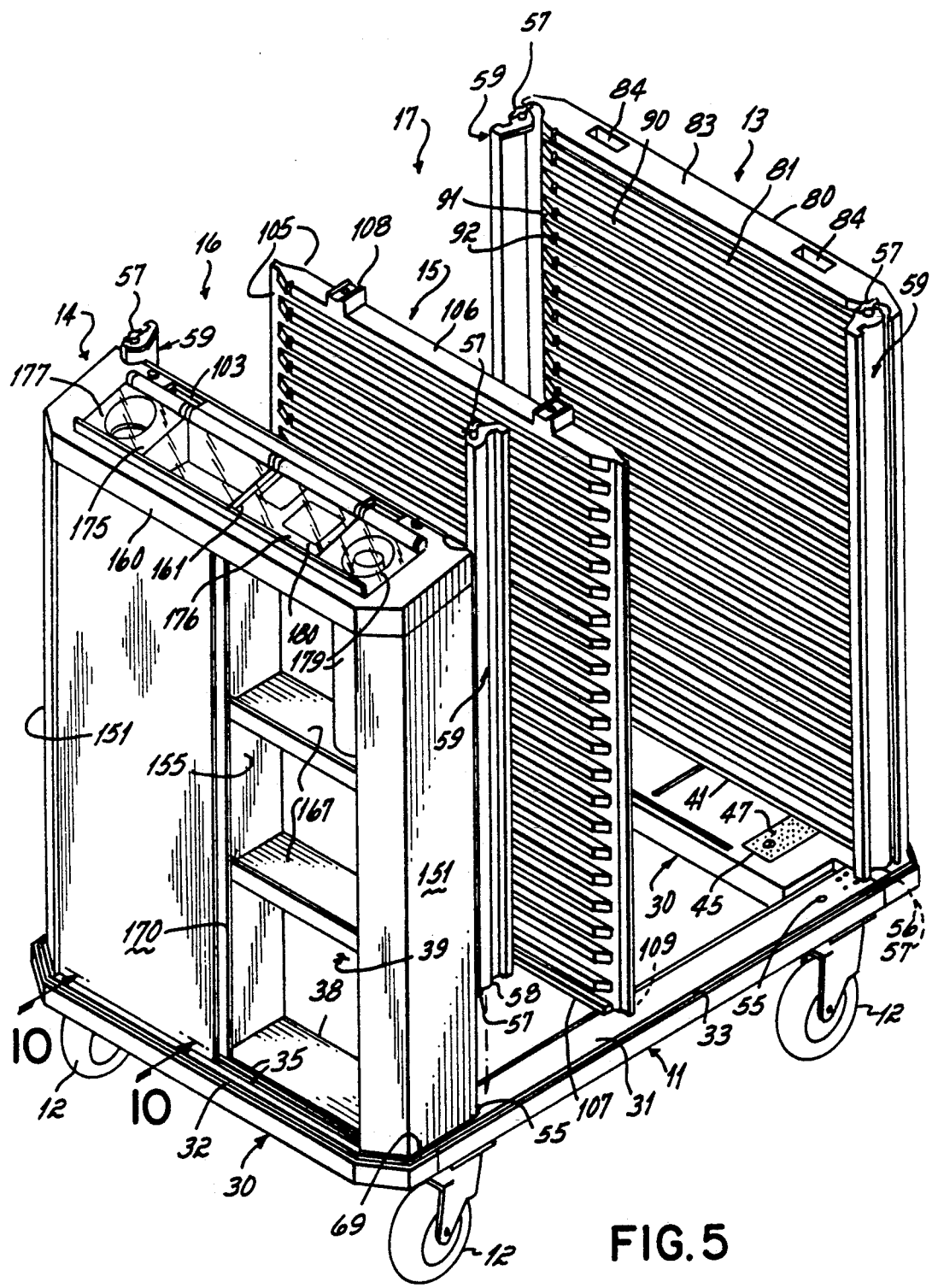
FIG. 5 is a view similar to FIG. 3 except having the cabinet more completely assembled.
Figure 12:
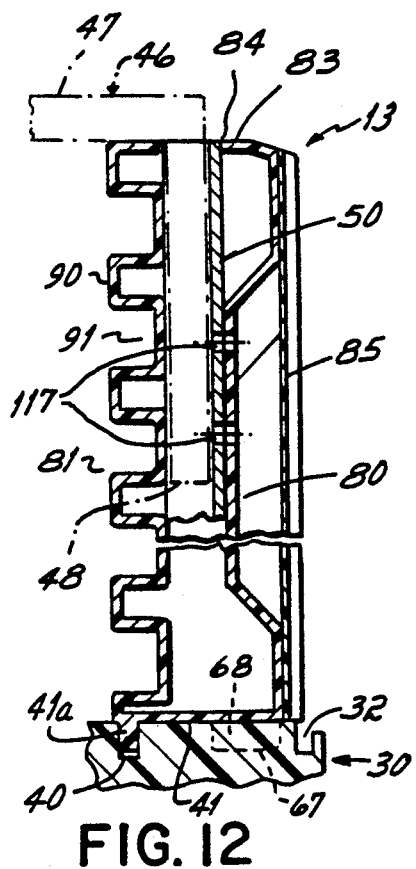
FIG. 12 is a fragmentary cross-sectional view taken on line 12—12 of FIG. 3.

Finally, the base has a circular recess 67 on each end to receive a circular mounting stud 68 at the lower end 69 of the cabinet 14 and on the lower end 41 of end panel 13, respectively (see FIGS. 2, 5 and 12).

Figure 9:
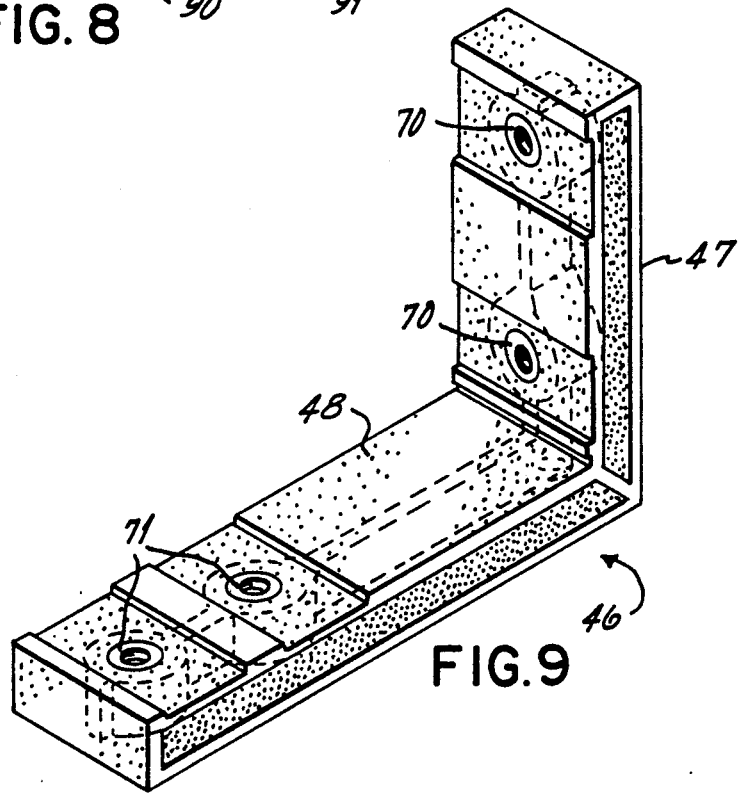
FIG. 9 is an enlarged perspective view of an L-bracket.

Each L-bracket 46 (FIG. 9) can be formed of aluminum or COMTUF 464, a PBT type polyester with 55% chopped glass, manufactured by Comalloy. This engineered plastic is selected because of its great strength as well as its resilience. If the cart is stressed in a direction to rack it, the glass-filled PBT L-brackets 46 will resiliently cause the cart structure to return to its original squared-up attitude. It is preferable to use a combination of aluminum and engineered plastic L-brackets 46 to obtain the best results in relation to resilience and flexibility.

Each L-bracket has on the horizontal leg 47 two threaded inserts 70 molded therein by which the L-bracket is bolted to the base plate 30, two corresponding holes being formed in the recess 45 through which bolts pass.

The vertical legs 48 also have two threaded inserts 71 molded therein. The vertical posts 50 are channel-shaped and each receives the vertical leg 48 of its respective L-bracket 46. Bolts tie the posts and panels 13, 39 securely to the L-brackets.

Figure 3:
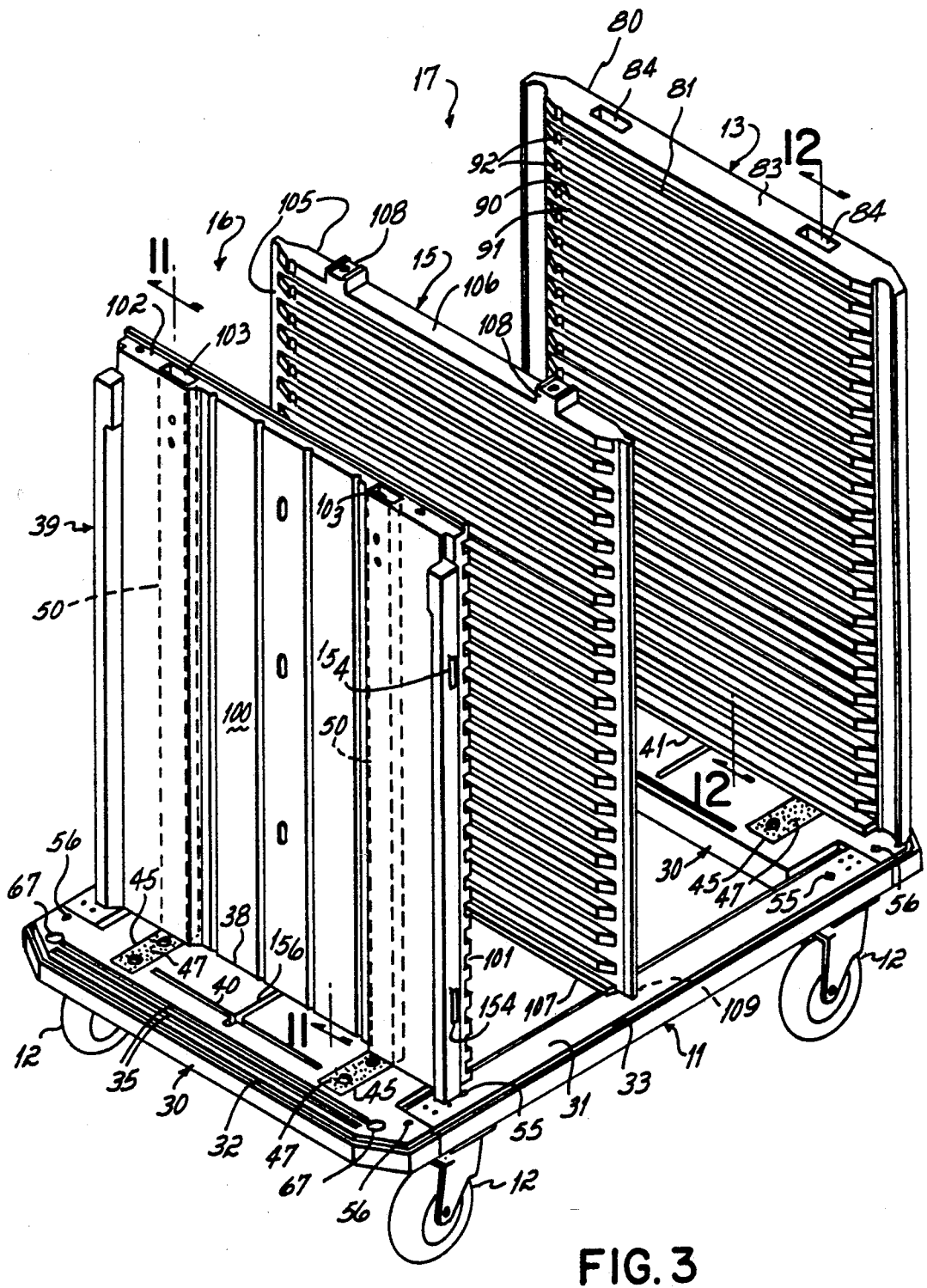
FIG. 3 is a view similar to FIG. 2, except having the end, middle and cabinet panels assembled.
Figure 4:
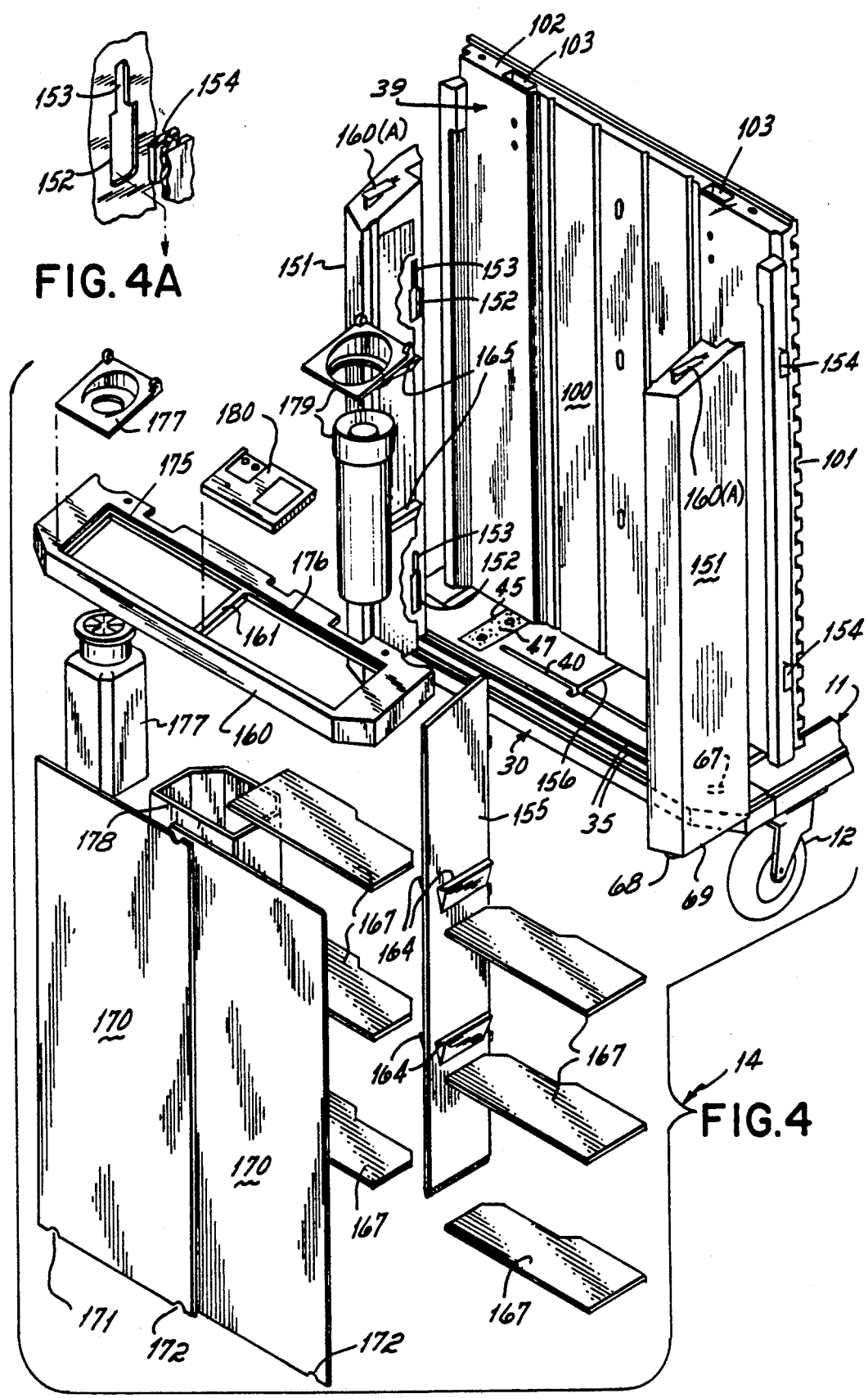
FIG. 4 is a disassembled perspective view of the cabinet.

Referring now to FIGS. 3 and 5, it can be seen that the base plate 30 can mount a cabinet 14 or an end panel 13. If it is the cabinet that is mounted on the plate, the L-brackets are oriented with their vertical legs on the inner edge of the base plate. Alternatively, if the end panel 13 is to be mounted, the L-brackets are oriented with their vertical legs adjacent the outer edge of the base plate.

The end panel 13 is hollow. It has an outer sheet 80 and an inner sheet 81. The vertical edges of the outer sheet 80 are integrally molded to the vertical edges of the inner sheet 81. Top 83 and bottom walls 41 are integrally molded to the inner and outer sheets 80, 81 to enclose the hollow panel. The walls 41, 83 have rectangular holes 84 cut or routed in them. The posts 50 project through the holes 84 and are thus received in the interior of the panel 13. The panel 13 is preferably blow-molded from a high density polypropylene so that it is an extremely rugged, although lightweight, element.

The outer surface of the sheet 80 receives a decorative panel 85. Instead of a panel 85, other accessories, such as waste containers and the like, can be mounted on sheet 80. The inner sheet 81 has a plurality of horizontally-extending, vertically-spaced ribs 90, leaving alternating grooves 91 in which the drawers of the type illustrated at 18 and/or the cassette 20 are slidably mounted. Each rib 90 has a notch 92 on one end which is available for receiving and retaining cassettes.

At the opposite end of the illustrated cart the cabinet back panel 39 is formed similarly to the end panel 13. It is hollow and it has an outer sheet 100, an inner sheet 101, the outer and inner sheets being integrally joined on their vertical edges and joined by top and bottom walls 102, 38 on their upper and lower ends. Rectangular holes 103 are formed on the top and bottom walls, and the posts 50 pass through those holes and are received within the hollow cabinet back panel. The rib structure of the cabinet back panel is identical to that of the end panel 42. The lower walls 41 and 38 of the panels 42 and 39 have elongated ribs or tongues 41a and 38a that seat in the grooves 40 and 37 to locate the panel in respect to the base 30.

Optionally, for the illustrated longer cart a middle panel 15 is employed. The middle panel is formed similarly in a single molding operation similar to the panels 39 and 42. It has two spaced sheets 105 joined together at their vertical edges. It has a top 106 and bottom wall 107 which joins the upper and lowers edges of the sheets 105. The top wall has locator studs 108. The connecting rails 31, in the longer cart, have holes 109 which locate the middle panel 15 and secure the panel 15 by bolts, not shown.

Figure 6:
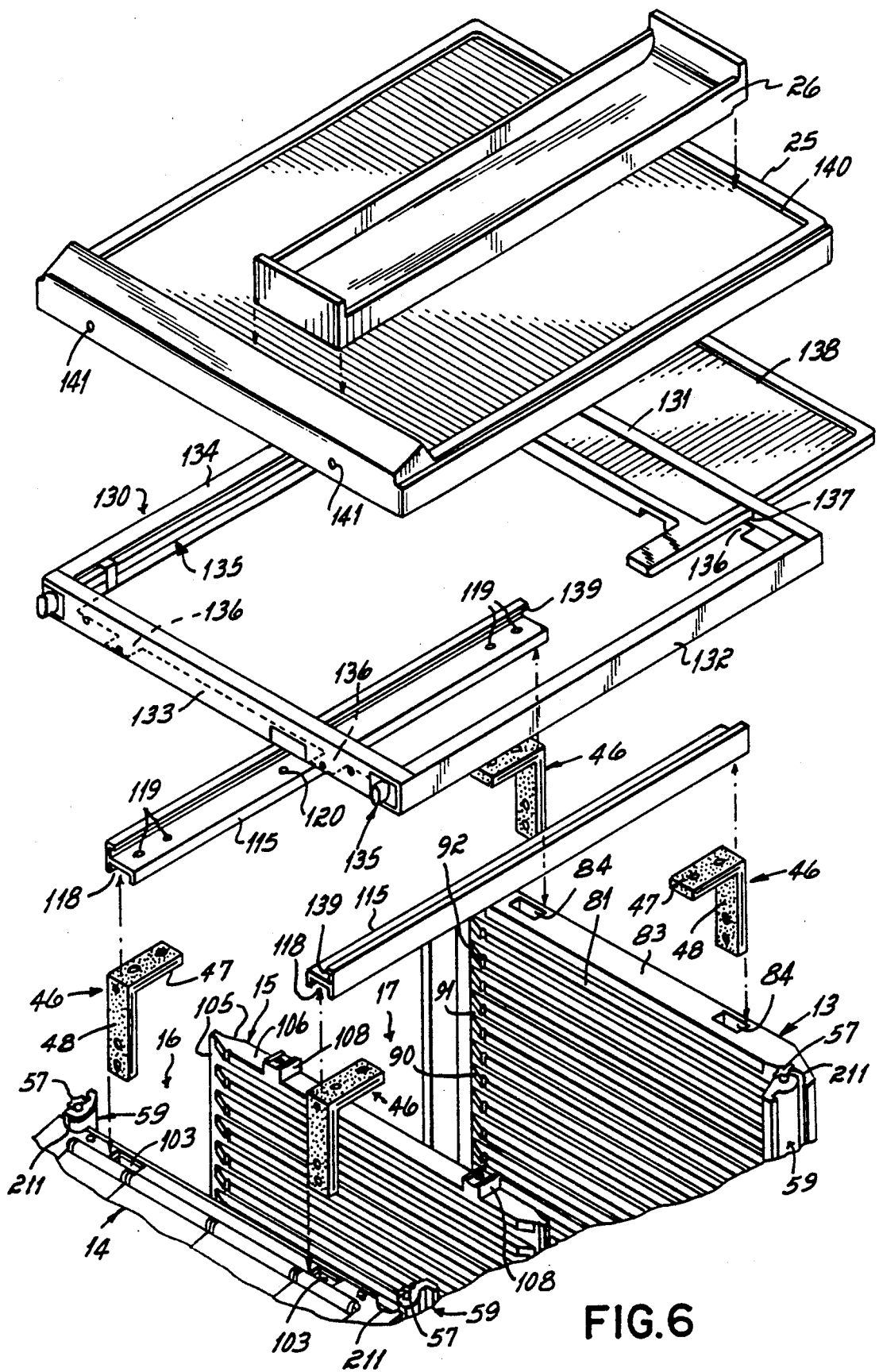
FIG. 6 is a disassembled perspective view of the cart's top structure.

As best shown in FIG. 6, a pair of top connecting rails 115 are joined to the upper ends of the posts 50 by L-brackets 46 identical to the L-brackets 45 at the lower ends of the post 50. Threaded inserts 71 are used to join the vertical legs 48 of the L-brackets to the upper ends of the posts 50 through the holes 117. Each top rail 115 has a downwardly-facing channel 118 which receives the horizontal leg 47 of the L-bracket and is bolted to it through the threaded inserts 70 on the horizontal leg 47 and corresponding holes 119 on the top rail. The studs 108 on the middle panel 15 are received in the channel 118 of the connecting rail 115 and are bolted to it through an appropriate hole 120 in the rail.

A locking collar 130 is rectangular in shape and is formed from four stainless steel channels 131, 132, 133 and 134. The locking collar is self contained and has within the confines of the channels 132, 134 a locking apparatus 135. The apparatus 135 may be either a mechanical locking apparatus or an electronic locking apparatus that is known. The channel members 131 and 133 are notched as at 136 to receive the legs 48 of brackets 46 when the collar 130 is seated on the upper surfaces 83, 102 of panels 13 and 39. The collar 130 is secured to each L-bracket by a screw after the collar is placed in position An opening 137 in the channel 131 is provided to permit the passage of a slidable writing surface 138, the sides of surface 138 sliding beneath lips 139 of rails 115.

The plastic top cap 25 is seated on the locking collar 130 and is fastened to it by screws passing through holes 141. The top cap 25 has a recessed top surface 140 on which the rectangular tray 26 can be seated to contain the accessories needed by the nurse.

As can be seen in FIGS. 4, 4A, 5 and 7, a pair of cabinet wing walls 151 are joined to the vertical edges of the cabinet end panel. Each wing wall has a T-shaped receptacle 152 with a ramp 153 to enter it. A T-shaped male rib 154 is on the cabinet end panel 39 and the male rib slides into the female receptacle 152 in a press fit relationship that tightly ties the wings to the cabinet back panel. A divider 155 is positioned between the two wings 151. A groove 156 in the base plate 30 receives the lower end of the divider panel.

Figure 10:
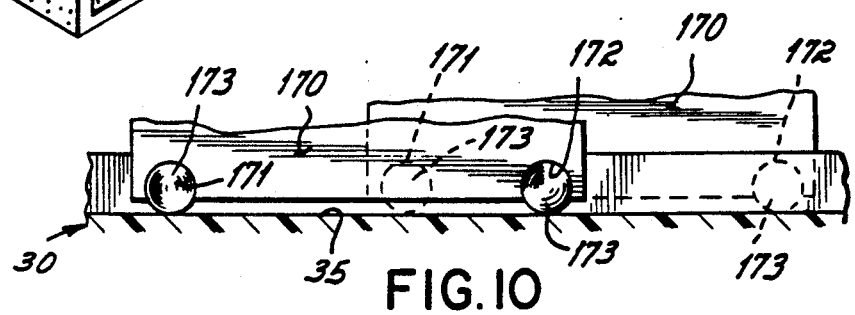
FIG. 10 is a fragmentary diagrammatic view as seen on line 10—10 of FIG. 5.

A cabinet control panel frame 160 is mounted over the assembly of back panel 39 and wing walls 151. The cabinet control panel frame 160 is secured to the wing walls 151 by T-shaped receptacles 160A and T-shaped ribs in control panel frame 160, not shown, and bolted to the top wall 102 of the back panel. The cabinet control panel frame 160 has two notches (not shown) underneath the center bar 161 which receive the upper end of the cabinet divider 155. Thus, the cabinet divider 155 is held securely in place. The cabinet divider 155 has horizontal ribs 164 which cooperate with horizontal ribs 165 on the respective wings to receive horizontal shelves 167, the shelves being an optional part of the unit and may be removed if desired. Sliding doors 170 are received at their lower ends in the grooves 35 of the base plate 30. At the upper ends, the sliding doors are received in an extrusion mounted in the undersurface of the control panel frame, not shown. Each sliding door 170 has at its lower edge two partial circular holes 171 and 172 (FIG. 10). The holes are slightly over 180° in circumference. Disk-like nylon bearings 173 are loosely inserted in the holes and provide antifriction bearings for the movement of the sliding doors.

The cabinet control panel frame 160 has two rectangular holes 175 and 176. Those holes can receive different types of containers for different types of instrumentalities. For example, a bio hazard waste insert 177 (for hypodermic needles), a general waste insert 178, a drinking cup dispenser insert 179 and an electronic insert 180 are adapted to fit into the holes 175, 176. The electronic insert contains a keyboard for the electronic operation of the control locks and security alarm system.

Figure 8:
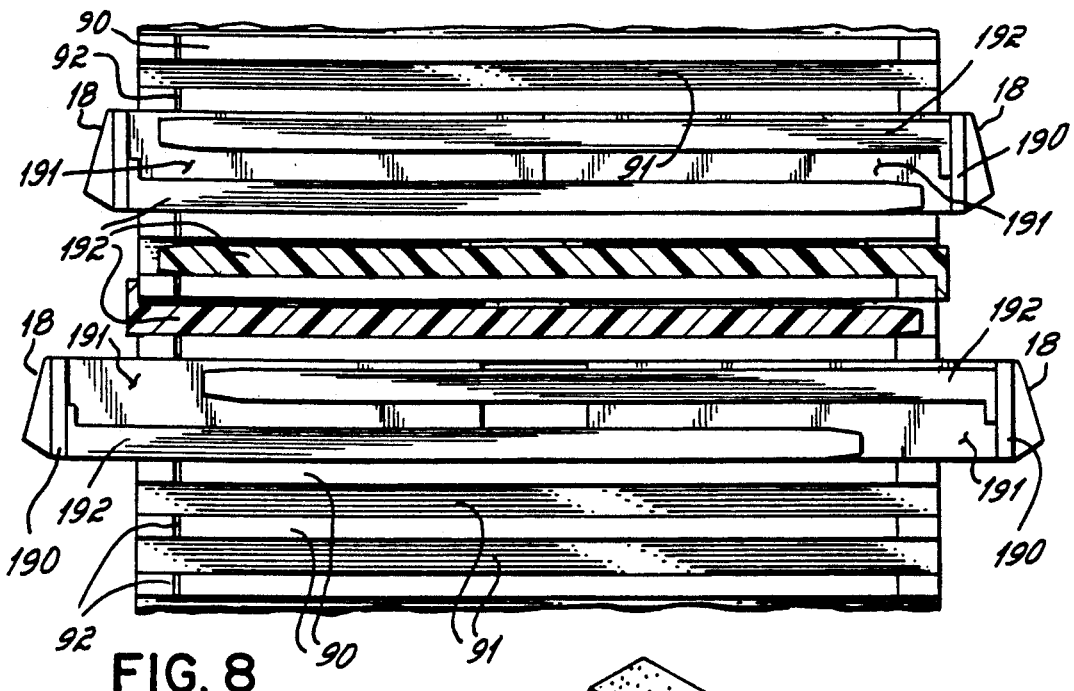
FIG. 8 is a partial view taken on line 8—8 of FIG. 7.

Exemplary drawers 18 are shown in FIG. 8. Each drawer has a front wall 190 containing patient-identifying indicia and a pair of spaced side walls 191. The drawers on one side of the cart have rails 192 on the upper portion of the drawer. Those rails slide on the one set of opposing ribs 90 in the grooves 91. The opposite drawer has the rail 192 mounted at the lower portion of the drawer, and it slides in alternate grooves 91 so that rails extend all the way through the cart for the stability of the drawer but with the rails from the cart on opposite sides of the cart avoiding interference with one another.

Figure 7:
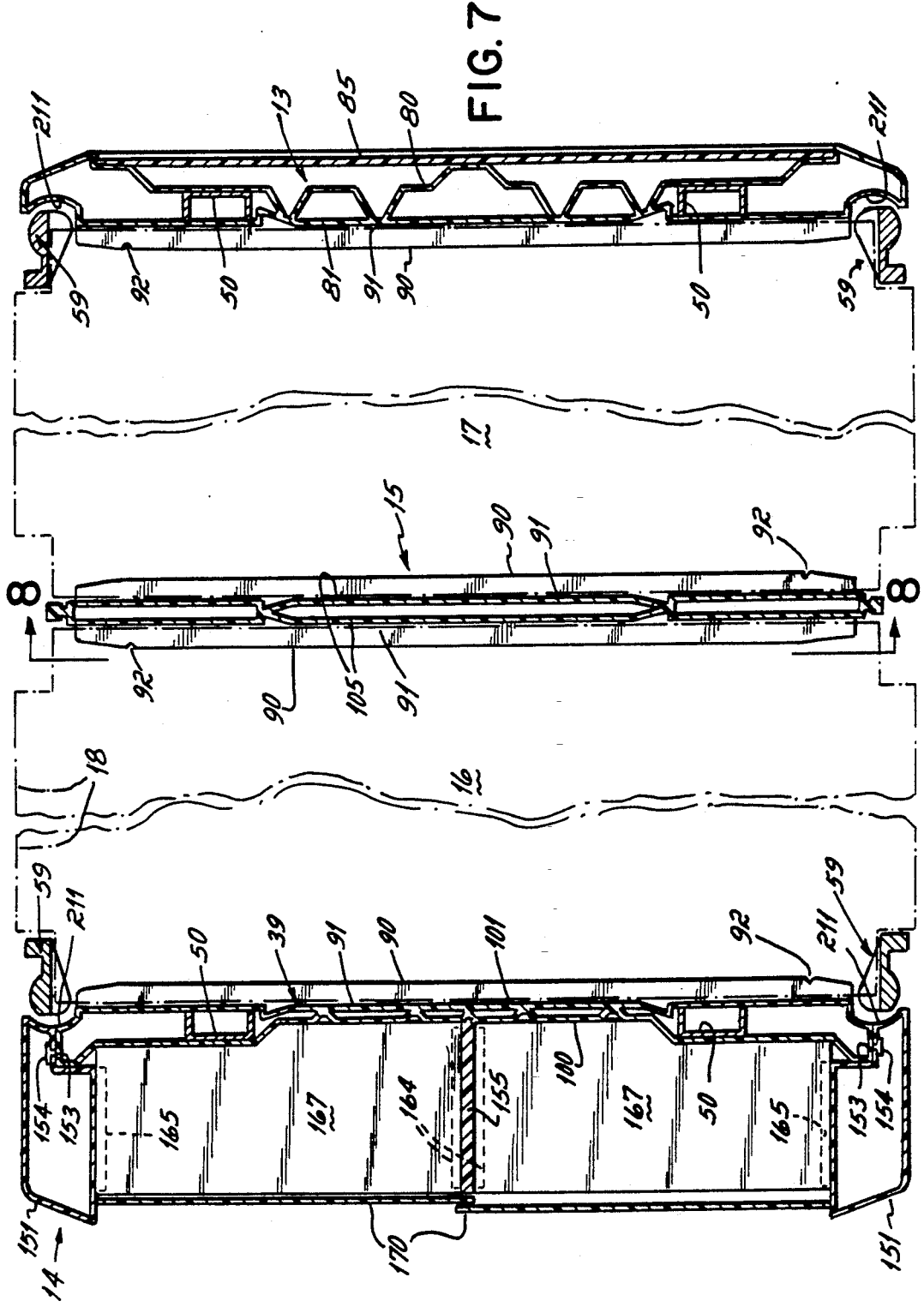
FIG. 7 is a cross-sectional view taken on line 7—7 of FIG. 1.

In one embodiment, as best seen in FIGS. 7 and 13, each of the four corners of the cart has a locking bar 59 which is manually pivoted between unlocked and locked positions by the nurse. Each locking bar is a combination of mating aluminum extrusions. At its upper and lower ends, each locking bar has an adjustably-mounted plastic insert which presents a projecting stud 57. On its lower end, the projecting stud 57 has wings 61 that pass through the lateral slots 60 of the hole 55 or 56 in the base plate. At the upper end, the locking bar is received in a similar hole 200 having lateral slots 201. That hole is formed in an L-shaped plastic plate or fitting 205 mounted in the locking collar 130. Adjacent the hole 200 is a rectangular hole 206 through which a bolt 207 passes. The bolt is spring-loaded in a downward direction to engage a rectangular hole 209 on the upper end of the locking bar. The fixed relationship of the hole 200 and the bolt 207 with respect to the stud 57 and the hole 209 assures the alignment of the bolt with the hole 209. The bolt 207 has a laterally-projecting pin 210 that can be raised and lowered either electronically or mechanically by plunger 135 (which can be key operated or electronically operated by the keyboard 180 to lock and unlock the locking bar).

The panels 39 and 13 have vertical grooves 211 along their vertical edges. Those grooves form arcuate cross section receptacles in which the locking bars 59 rotate. As can be seen from the drawings, when the locking bar is in its unlocked position, rotated into the recess 211, the bar is within the confines of the bumper 34 and is thus protected against damage which might occur if the cart bumps into a wall, door or the like. When the bar is in its locked position, it overlies the drawers and prevents them from being opened by a scallywag.

For the bars 59 to be secure in the locked position, the upper end of each bar 59 must be in contact with or in very close proximity to the bottom of plate 205. If there is a gap between the bar 59 and plate 205 of sufficient size to expose bolt 207, a security risk arises because the bolt 207 is susceptible to being pried up, which would allow the previously locked bars 59 to be opened. Because of this potential security risk, the bars 59 of the FIG. 13 embodiment have been manufactured to fit snugly within the cart frames. However, such a snug fit can cause these bars 59 to bind up or jam when being opened and closed, if the cart frame shifts or otherwise distorts. In addition, each cart's set of bars has to be custom sized in order to obtain this snug fit, which increases costs.

Figure 17:
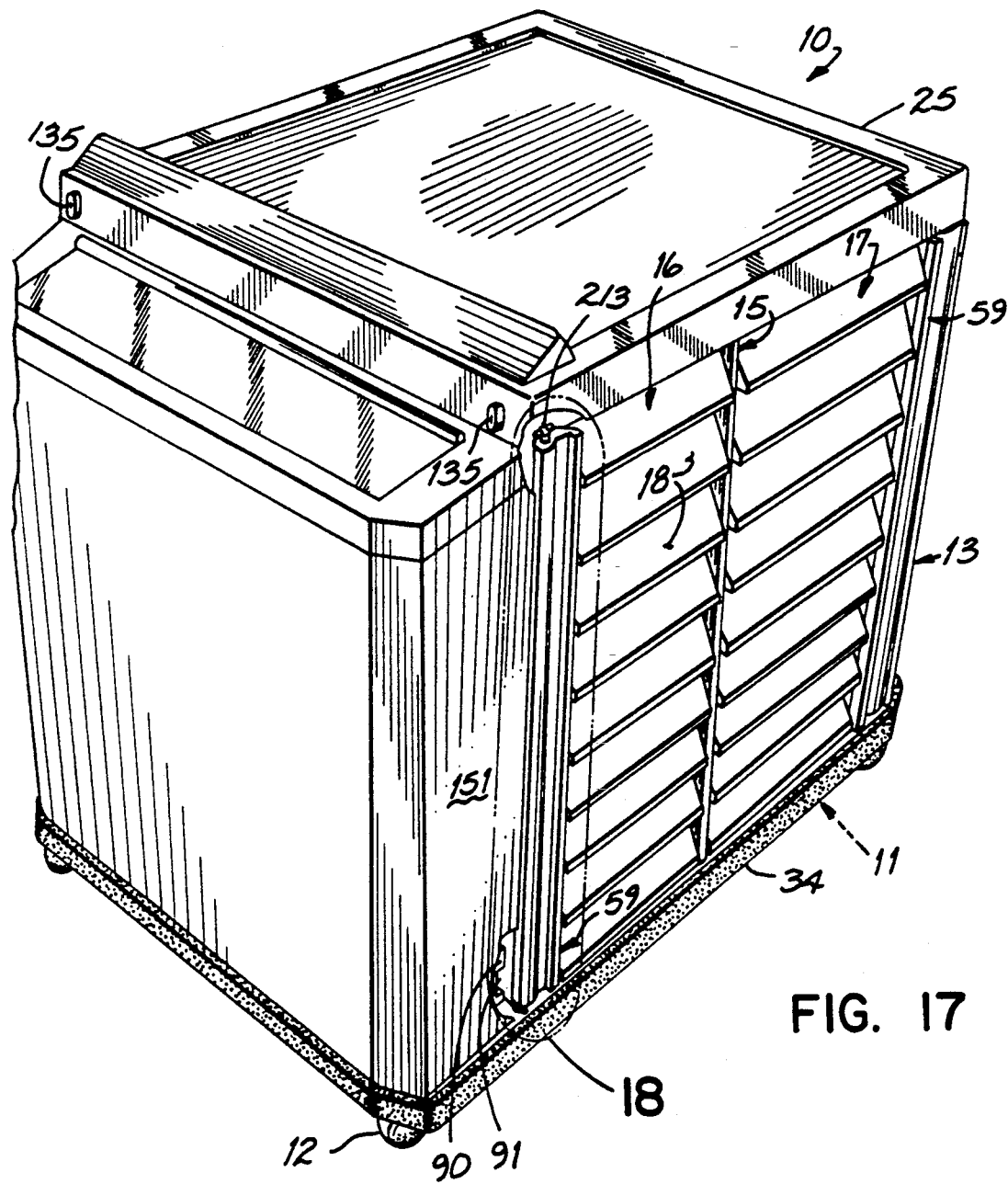
FIG. 17 is a perspective view of a cart with a portion of the cabinet panel broken away to reveal the entire locking bar.

The preferred embodiment shown in FIGS. 17 and 18 was developed to allow shorter, loose fitting, bars 59 of uniform length to be used, thus significantly reducing the likelihood of binding or jamming and reducing costs, while at the same time insuring that the upper ends of the bars 59 fit snugly against the bottom of plate 205, eliminating the potential security problem. In addition, the bars 59 shown in FIGS. 17 and 18 automatically pivot from the locked or closed position to a fully open position, thus allowing a nurse to pull out any drawer or cassette without interference from the bars 59.

Referring to FIGS. 17, 18, 18A and 18B, the upper stud 213 and lower stud 214 have beveled wings 218 and 219, respectively. Dual ramps 220, one located on either side of hole 200, are formed as an integral part of plate 205. Thus, as the bar 59 pivots from the fully opened or unlocked position to the locked position, wings 218 ride up the ramps 220 (see FIG. 18A), thereby camming the upper end of bar 59 up against the bottom of plate 205. To ensure their structural integrity during this ramping process and for added security, wings 218 have been beefed up (i.e., reinforced), compared to the wings 61 shown in FIG. 13. The lower stud 214 is elongated to allow bar 59 to move upward along with wings 218. A torsion/compression spring 222 is wound around stud 214 and located between base 11 and the lower end of bar 59, with one end of spring 222 positioned against a panel 13 or 39 and the lock bar 59 itself. Thus, the compressive quality of spring 222 aids in lifting bar 59 upward as wings 218 ride up ramps 220 when bars 59 are closed to the locked position and help to close up any residual spacing that might remain between the upper end of bar 59 and the bottom of plate 205. The torsion quality of the spring 222 causes bar 59 to automatically pivot from the closed and locked position to the fully opened and unlocked position when the bars 59 are unlocked. This same torsion quality provides a positive force to maintain the bars 59 in the fully opened and unlocked position.

Thus, the combination of the ramping of wings 218 and the upward force of spring 222 causes the bar 59 to be automatically located in its most secure position by eliminating or reducing significantly the gap between the upper end of bar 59 and the bottom of plate 205. And, the combination of the elongated stud 214 and the compressiveness of spring 222 enables bars 59 to move, up and down, (i.e., compensate) for shifting or distortion of the frame.

For the lock bar embodiment of FIG. 13 to work properly, each bar 59 must be custom fit for each cart frame because the bars 59 are of a fixed length and do not move vertically. With the preferred embodiment shown in FIG. 18, there is no longer any need to adjust each bar 59 to eliminate the gap. Because of their freedom of vertical movement while in the open position (typically a maximum of about ⅛"), each bar 59 is less likely to bind up or jam. In addition, while in the closed and locked position, the upper ends of the bars 59 are not only typically snug against plate 205 (for security) there is a large enough gap at the lower end of the bars 59 to make up any dimensional differences in the cart frame that may occur during manufacturing. Thus, a uniform bar size can be used, reducing costs.

It can be seen from the foregoing that by molding parts such as the base plate, the vertical panels and the L-brackets, the carts can be reliably and uniformly assembled very rapidly. Furthermore, the carts can be shipped in a knocked-down condition, thereby occupying very little space. Assembly by the distributor recipient is a task easily learned and easily performed. The plastic parts reduce the weight of the cart, the new cart being about two-thirds the weight of the prior stainless steel-framed cart. The instant cart is not as high as its predecessor. The panels can be formed in colors that are warm and friendly to the user. The feel of the cart is warm compared to that of a metal cart.

By referring to FIGS. 14A through 16C, an illustration of the wide variety of carts that can be formed from the fundamental components can be observed. The cart 14A utilizes the standard base plates 30, end panels 13 and cap 25.

Figure 14A:
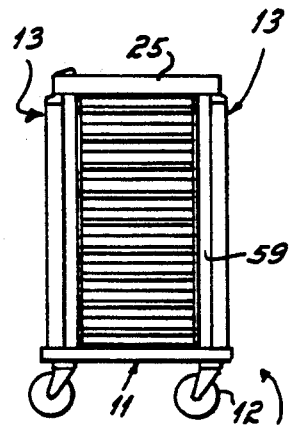
FIGS. 14A, 14B and 14C are diagrammatic side views of a cart showing some of the various drawer modifications, the cart being assembled with panels on each end.
Figure 14B:
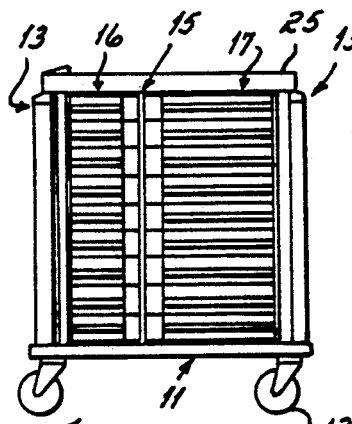

In the cart of FIG. 14B, a longer cap is employed and middle panel 15 is employed in order to provide a divided cart.

Figure 14C:
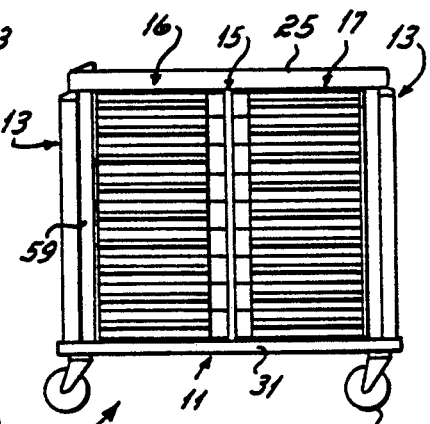

The components of the cart of FIG. 14C are substantially the same except that the cap is of a greater longitudinal dimension, as are the longitudinal bottom rails 31.

Identical end panels and center walls, posts, L-brackets and the like are employed.

Figure 15A:
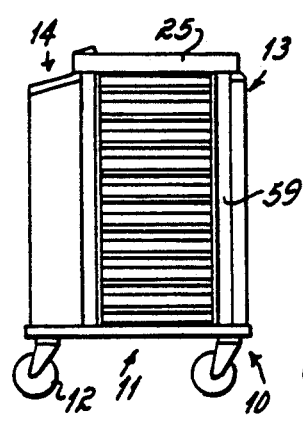
FIGS. 15A, 15B, and 15C are views similar to FIGS. 14A-14C except the cart is assembled with an end panel at one end and a cabinet at the other end, FIG. 15B being the cart illustrated in FIGS. 1-6.
Figure 15B:
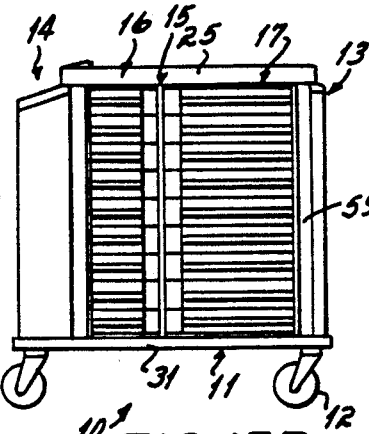
Figure 15C:
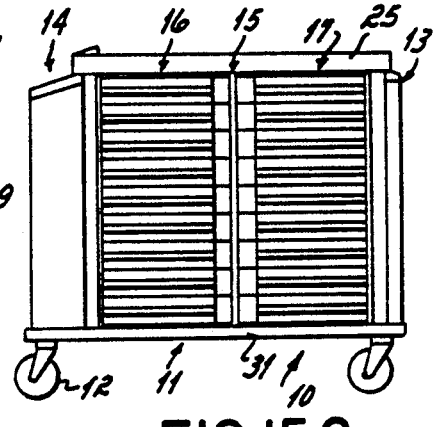

The cart of FIG. 15A is similar to the cart of FIG. 14A except that a cabinet 14 takes the place of the end panel 13 on one side of the cart and the bottom connecting rail varies to accommodate the various sizes. That same observation is true for FIGS. 15B and 15C.

Figure 16A:
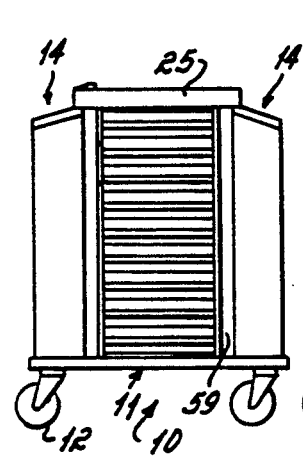
FIGS. 16A, 16B and 16C are views similar to FIGS. 15A-15C, except the cart is assembled with a cabinet on each end.
Figure 16B:
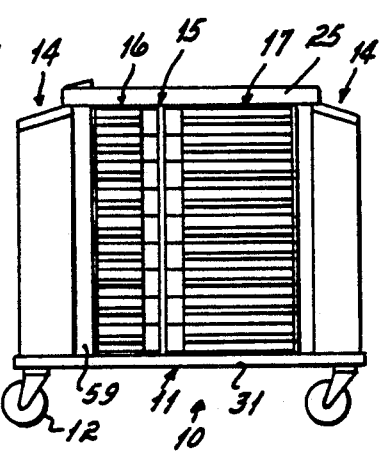
Figure 16C:
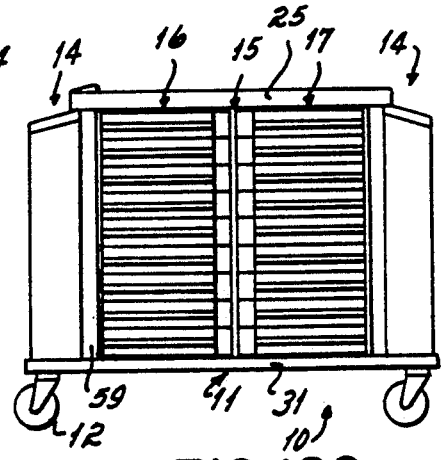

The cart of FIG. 16A employs a cabinet 14 at both ends of the cart and is otherwise identical to the cart of FIGS. 14A and 15A except that the bottom connecting rail varies to accommodate the additional cabinet. That same observation obtains for the carts of FIGS. 16B and 16C.

Other variants are within the scope of the invention. These variants will, however, use the common basic elements such as base plates, vertical panels with the drawer ribs and top caps that provide the rugged cart structure, the lightweight structure and the ease of assembly.

From the above disclosure of the general principles of the present invention and the preceding detailed description of a preferred embodiment, those skilled in the art will readily comprehend the various modifications to which the present invention is susceptible. Therefore, we desire to be limited only by the scope of the following claims and equivalents thereof:

We claim:

1. In a medication cart having a base, two spaced end panels mounted on said base and slidable drawers supported by said end panels, a door lock comprising:
    a vertical locking bar on at least one corner on one side of said cart, said locking bar having a vertical axis,
    a lock collar mounted above said panels,
    said locking bar having studs at its upper and lower ends,
    said lock collar and base having holes to receive said studs, thereby mounting said lock bar for pivotal movement about said vertical axis,
    and means on said lock collar for locking said bar across said drawers.

2. A door lock as in claim 1 in which said end panels are hollow, molded plastic elements having vertical edges,
    the vertical edge adjacent each locking bar having a vertical groove,
    each locking bar pivoting into said groove when said lock bar is in an unlocked condition.

3. A door lock as in claim 1 in which said locking means comprises:
    a hole in the upper end of said locking bar,
    a bolt in said lock collar mounted for vertical sliding movement into and out of said hole in said locking bar,
    and a fitting in said lock collar having spaced holes for said locking bar stud and said bolt, respectively, to maintain proper spacing that assures entry of said bolt into said locking bar hole.

4. A door lock as in claim 1 further comprising means, on each, locking bar for automatically pivoting said locking bar from a closed to a fully open position, after said locking bar is unlocked.

5. A door lock as in claim 4 in which said automatic pivoting means comprises:
    at least one torsion spring surrounding a lower stud, said spring having one end bearing against an end panel and the other end bearing against a locking bar, wherein said torsion spring interacts between said end panel and said locking bar.

6. A door lock as in claim 5 in which said torsion spring is also a compression spring that urges said locking bar upwardly against said lock collar.

7. A door lock as in claim 1 further comprising:
    means for positioning the upper end of each locking bar in at least close proximity to said lock collar when said locking bar is pivoted across said drawers to a closed position.

8. A door lock as in claim 7 in which said positioning means comprises:
    at least one beveled wing projecting laterally from the upper stud on each locking bar;
    the hole in said lock collar for receiving said upper locking bar stud having at least one lateral slot formed as a part thereof, wherein said slot allows said winged stud to pass through said upper stud receiving hole; and
    a ramp located adjacent to each upper stud receiving hole and positioned such that said wing rides up and down said ramp as said locking bar is closed and opened, raising and lowering the upper end of said locking bar.

9. A door lock as in claim 8 in which said positioning means further comprises:
    a compression spring located at the lower end of each locking bar and interacting between the lower end of said locking bar and the base of said cart to exert an upward force on said locking bar.

10. In a medication cart having a base, two spaced end panels mounted on said base and slidable drawers supported by said end panels, a door lock comprising:
    a fitting mounted above said panels at a corner of said cart and having an upper hole;
    said base having a lower hole aligned with said upper hole;
    a locking bar having a vertical axis and studs at its upper and lower ends projecting into said upper and lower holes respectively, said locking bar being pivotable about said vertical axis;
    cam means between said upper stud and said fitting to cam said locking bar up against said fitting when said locking bar is pivoted to a closed position overlying said drawers; and
    means for locking said locking bar in the closed position.

11. A door lock as in claim 10 in which said cam means comprises:
    a pair of wings projecting laterally from the upper end of said upper stud; and
    ramps on said fitting engageable with said wings to ramp said studs and locking bar upwardly when said locking bar is swung closed.

* * * * *